United States Patent
Campos Canton et al.

(10) Patent No.: US 10,171,229 B2
(45) Date of Patent: Jan. 1, 2019

(54) PSEUDO-RANDOM BIT GENERATOR BASED ON MULTIM-MODAL MAPS

(71) Applicant: Instituto Potosino de Investigación Cientifica y Tecnológica A.C., San Luis Potosí (MX)

(72) Inventors: Eric Campos Canton, San Luis Potosí (MX); Moises Garcia Martinez, San Luis Potosí (MX)

(73) Assignee: Instituto Potosino de Investigacion Cientifica y Tecnologica AC, San Luis Potosi (MX)

(*) Notice: Subject to any disclaimer, the term of this patent is extended or adjusted under 35 U.S.C. 154(b) by 215 days.

(21) Appl. No.: 15/190,616

(22) Filed: Jun. 23, 2016

(65) Prior Publication Data
US 2016/0380760 A1 Dec. 29, 2016

Related U.S. Application Data

(60) Provisional application No. 62/184,600, filed on Jun. 25, 2015.

(51) Int. Cl.
*H04L 29/06* (2006.01)
*H04L 9/00* (2006.01)
(Continued)

(52) U.S. Cl.
CPC .............. *H04L 9/001* (2013.01); *G06F 7/582* (2013.01); *H04L 9/0668* (2013.01); *H04L 9/12* (2013.01); *H04L 2209/60* (2013.01)

(58) Field of Classification Search
None
See application file for complete search history.

(56) References Cited

U.S. PATENT DOCUMENTS

| | | | |
|---|---|---|---|
| 8,358,783 B2 * | 1/2013 | Davis | G06F 21/606 380/260 |
| 2002/0054682 A1 * | 5/2002 | Di Bernardo | H04L 9/001 380/263 |

(Continued)

*Primary Examiner* — Malcolm Cribbs
*Assistant Examiner* — Andrew J Steinle
(74) *Attorney, Agent, or Firm* — Defillo & Associates I; Evelyn A Defillo (57) ABSTRACT

The present invention is related with a computer-implemented method for generating a pseudo-random bit generator including the steps: a. Defining a multi-modal map by the equation: $f_\beta = \beta(d_{r+1} - x)(x - d_r)$, $x \in \mathfrak{S}_r$; b. Set the value of $k \in \mathbb{N}^+$, and obtaining the values of $\beta_j$, for j=from at least 1, to the final value k by the following equations: $\beta_1 = 4k$; $\beta_j = (j)(\beta_1)$; for $2 \le j \le k$; and taking the values of $\beta_j$ and split the space into 2j regions $\delta_1^j$, to $\delta_{2j}^j$ which are determined by values $\kappa_1^j$ to $k_{(2j)-1}^j$.

4 Claims, 4 Drawing Sheets

(51) Int. Cl.
*G06F 7/58* (2006.01)
*H04L 9/06* (2006.01)
*H04L 9/12* (2006.01)

(56) References Cited

U.S. PATENT DOCUMENTS

2011/0231742 A1* 9/2011 Olson ............... G06F 11/24
 714/799
2015/0202440 A1* 7/2015 Moehlis ............ A61N 1/378
 607/45

* cited by examiner

PSEUDO-RANDOM BIT GENERATOR BASED ON MULTIM-MODAL MAPS

CROSS-REFERENCE TO RELATED APPLICATIONS

This application claims the benefit of priority to U.S. Provisional Application No. 62/184,600, filed Jun. 25, 2015, the contents of which are incorporated herein by reference.

FIELD OF THE INVENTION

The instant invention refers to the secure informatics field, particularly, to a pseudo-random bit generator which is produced through dynamic systems in discrete time unidimensional multimodal, called k-modal maps. Furthermore, the impact of using these pseudo-random sequences in stream ciphering resulting in a better ciphering quality correlated with the modal number of the chaotic mapping, is presented. The proposed algorithm can cipher through adding a stochastic vector to the plane image, that is, the same set of keys generates a ciphered image each time different from the ciphered plane image. Also, the present invention relates to the field of computer dynamics and, more particularly, to structures dynamically configurable of linear basic logic gates; which they are able to change their response in accordance with the threshold reference signals, to compensate these signals in order to produce different logic gates. These dynamic logic gates would support the development of logic chips for next-generation computers and their applications in new electronic devices.

This invention comprises at least one application of an algorithm based on chaos mathematics (chaotic dynamical systems), which are correlated to number of modals in a chaotic map. The main applications are optimizing quality encryption from objects employing sequences from a bit string cipher, which come from a pseudorandom generator, where such sequences are obtained from a multimodal uni-dimensional discrete dynamical systems called k-modal maps.

The implementation in optimizing the quality encryption is performed by adding a stochastic vector to the plain image (probabilistic uniform function), this is, and the same set of keys generates a different cipher image each time it is used.

BACKGROUND OF THE INVENTION

A discrete-time dynamical system is given as follows: $x_{n+1}=f(x_n)$, $n=0,1,2,\ldots,N$, where $x_n \in \Re$ and $x_0$ is the initial condition, such dynamical system is usually referred to as map, as it is fully determined by its right hand side. The simplest maps are the so-called uni-modal maps like the logistic and tent maps, while their generalization, the so-called multi-modal or k-modal maps may present even more rich dynamical behaviors.

Definition 1: A map $f: \Im \to \Im$ is called as the k-modal one, if it is continuous on $\Im$ and it has k critical points denoted by $c_0, c_1, \ldots, c_{k-1}$ in $\Im$. Moreover, there exist intervals $\Im_i$, $i=0, \ldots k-1$, $\cup_{i=1}^{k} \Im_{i-1}=\Im$, such that $\forall i=0,\ldots,k-1$, it holds $c_i \in \Im_i$ and $f_\beta(c_i) > f_\beta(x)$ $\forall x \in \Im_i$ and $x \neq c_i$, where $\beta$ is a parameter.

The case k=1 will be further simply referred as to the so-called uni-modal map.

To be more specific, $\Im:=[0,1]$ and recall that a critical point c of the continuous piecewise smooth map $f(x)\Im \to \Im$ is $c \in \Im$ where f is differentiable and $f'(c)=0$.

A critical point c occurs for $f'(c)=0$ or $f'(c)$ does not exist. But continuous smooth maps always present $f'(c)=0$. The above definition does not constraint a function to have only k critical points. However it only considered those that are local maximum on a subinterval.

Definition 2. Random Number Generator (RNG) is a computer or hardware device designed to produce sequences of numbers without an order apparently.

Definition 3. Pseudo-Random Number Generator (PRNG) is an algorithm that produces a sequence of numbers with an excellent approximation to a set of random numbers.

Definition 4. Cryptographically Secure Pseudo-Random Number Generator (CSPRNG) is a pseudorandom number generator (PRNG) with features that make it suitable for use in cryptography.

Some patents that have implemented this type of significant expertise in the development of new technologies, are depicted herein below:

Typically a Pseudo-Random Bit Generator is based on a Linear Feedback Shift Register (LFSR), this generator consists of a group of flip-flops and exclusive OR, which allow some bits in the register to be true; in other words allowable in the register and selected bits are used, for example, scientific instruments used to measure the intensity of the solar radiation reflected by the earth in various directions and spectral bands; digital cameras are conventionally gathered in spectral bands at different angles for generating images with different wave lengths; the critical points of the above definition, allowing to generate an array representing entries image generation, the function of various wavelengths for these purposes.

A main feature of the proposed invention is that describes an algorithm for generating pseudo-random bits sequences, the usefulness of these sequences includes creating encryption keys and generating a chain-key, which can be equated to addresses spectral bands like LFRS operate; ie holistically, the generator is based on a dynamic discrete time system whose implementation is more versatile than that described above.

In the prior art are some patents related to applications that are contained in this application, such as:

The U.S. Pat. No. 8,738,675B2 patent (Random Number Generator using chaos in continuous time) relates to a method of generating random numbers based on continuous-time chaotic oscillators; where compensation frequency is employed to maximize the statistical quality of an output stream where the proposed circuit can be realized in integrated circuits and the use of continuous chaos in generating random numbers with a very high yield; another invention relates to Patent CN101364171B (real random numbers dynamic generator) relating to a generator, which employs data entered to Von Neumann validators to adjust the output bits by means of chaos conversion algorithms through discrete components and block cipher; especially using the Lyapumov index for the transformation of the block, as a way to control the chaos within a set range and the use of so called S-box that influences the transformation of encrypted blocks;

The patent U.S. Pat. No. 6,954,770 (Random Number Generator) comprising an oscillator with an output signal dependent on a random source which is not based on chaos theory, a sampling device for sampling the output signal of the oscillator to obtain a sampled oscillator output, and a fixed frequency clock driven by linear feedback shift register (LFSR) communicatively coupled to the sampling device through a digital gate to receive the output of the sampled oscillator, and to provide a random number in a LFSR output. Furthermore, the random number generator may comprise an optional communicatively coupled to the LFSR, to read the random number mixing function, and to insert the random number in an algorithm in order to obtain a robust random number; however, this technology depends only on the two oscillators and possible responses that keep only presents these two output options.

The above patents are useful in cryptography for generating keys/cipher/data input in symmetric ciphers. A set of patents that are related architectures chaotic computing logic gates based on nonlinear elements, while the present invention provides dynamically configurable structures linear basic logic gates are: U.S. Pat. Nos. 8,091,062, 7,973,566, 7,924,059, 7,863,937, 7,415,683, 7,096,437, 7,453,285, 7,925,814, 7,925,131 and US 2010/0219858 applications.

All of the above patents represent antecedents either input data, operation data or output data, but the type of related inventions contained in this application are those that relate to random number generators, where his output could be reproduced when the initial condition is known. A variety of such systems, eg U.S. Pat. Nos. 8,023,649B2 and 7,925, 014B2 which proposed algorithms pseudo-random generators based on cellular automata.

The pseudo-random generator proposed in this patent is based on the use of dynamic systems due to the intrinsic properties of these systems as are the sensitivity to initial conditions, complex and deterministic behavior, ergodicity, etc.

It includes implementations of dynamic continuous time systems, similar to those of the US2014101217A1, EP2758510A1 and U.S. Pat. No. 7,170,997B2 patents, which required the use of numerical methods for their evolution in time when they are implemented by software, however when implemented with electronic circuits or Field Programmable Gate Array (FPGA) is possible to obtain its evolution through hardware.

In the prior art there are pseudo-random generators based on dynamic discrete-time systems such as US2006251250A1 patent proposes a pseudo-random generator based on mapping systems Hénan and Lozi, the generation method consist on repeatedly iterate the system to generate the array of bits 1 or 0 whose possible dimension is 1×N, each iteration is converted to integer and finally using module 2 each iteration becomes a bit.

The S6064738A patent uses a mapping of two-dimensional (Baker Mapping) to build an array of bits with dimensions N×M, which performs a permutation of pixels, to exchange pixel places is important to note that performing this step the histogram of the image does not change, in addition, an extension of the mapping to three dimensions is made and then the value of the pixels is replaced so that in this way the distribution of pixels is changed , as if it were a function f(x, y) where x ε N and y ε M.

In U.S. Pat. No. 6,014,445A Patent Chebyshev map used to generate sequences with real values and has four methods in order to "binarizing" time series;

a) The first method is based on the use of a threshold b) The second methodology the absolute value is considered for each iteration, and then it takes its binary representation.

c) The third methodology it is a generalization of the second methodology such that a scaling-dependent interval where the system evolves is performed, so if the interval is [0,1] then the methodology 2 and 3 are equal.

d) In the fourth methodology it is considered M thresholds (these thresholds are the keys) so that each real value of the time series is evaluated by these thresholds and from a real value are obtained M bits, finally combine these M bits by operations XOR and obtain 1 bit per iteration.

The US2013129088A1 patent proposes a pseudo-random generator based on the combination of multiple discrete time dynamical systems, specifically using the cyclic shift map, for this defining k identical maps which are iterated independently then combined by XOR, so that for any iteration n it is previously required to iterate the k maps.

Finally, there have been proposals generators based on the following types:

First, using chaotic uni-modal maps, some of the patents disclose bit-stream pseudorandom generator using only a logistic map;

Second, using a bit string generated through a chaotic system, which is potentially unsafe because the output may leak some information about the chaotic system.

Third, by the use of two chaotic maps which are combined to obtain a complex bit-stream.

Objective of the Invention

The generator proposed pseudo-random bits is based on at least one pair of chaotic maps linear fragmented, which are iterated independently and are generated bit-stream by comparing the outputs of these chaotic maps and where a chaotic map only multimodal that can be used replace the two chaotic maps uni-modal for generating pseudo-random sequences.

This patent proposes the use of discrete-time dynamic multimodal systems (k-modal), which makes it possible to obtain k different time series with the advantage of using only a map, converting the time series real is through 2k thresholds, making each modal capable of producing a zero or a one, and finally the k binary strings are combined by XOR.

DESCRIPTION

The characteristic of this novel method for generating binary sequences through a pseudo-random bit-stream generator based on chaos are clearly shown in the following description and the accompanying figures, and a description of that, where follow same reference signs to indicate the parts and figures shown:

GENERAL DESCRIPTION OF THE NOVELTY OF THE INVENTION

The method for generating binary sequences through a chaos-based pseudo-random bit generator, broadly it involves the use of at least one pair of multimodal maps or k-modal, obtained from the previous definition of at least two uni-modal maps (map family), where the novelty is that the pseudo-random generators existing use combining at least two dynamic systems; in the present invention the generator employs a single system, which is capable of producing at least two systems (system family) for combining between them and more efficient encryption using at least one key for each generated system and apply multiple processes as for example the encrypted image.

This pseudo-random bit generator and the stream cipher are suitable for use in imaging, document, audio and/or video encryption, multimedia files, security Industrial Control Systems (ICS), and other security appliances.

Figure 1:
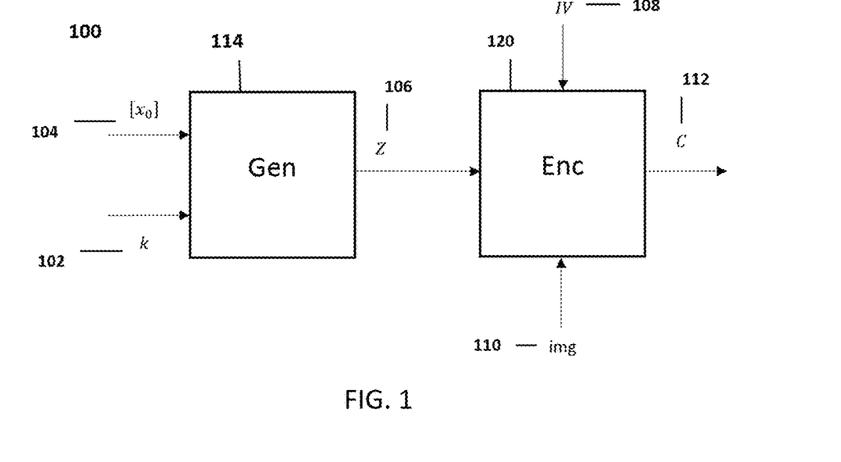
FIG. 1 is a general block diagram view of the pseudo-random bit generator based on chaos, which implements the method for generating binary sequences.

NOTE: The examples presented herein are merely declarative, but not limiting, so listed only to illustrate the application of the method and the novelty of its implementation in logical processing units. Based on the above figures, the pseudo-random bit generator chaos-based implement the following blocks in a logical processing unit:

BLOCK 1 (Gen).—SEQUENCE GENERATION. During this stage, a set of k independent sequences is generated {x1, x2, x3, x4, ... xk} where each sequence is produced using the dynamic system by a logic unit processing (computer, electronic tablet, etc.), then the k sequences are combined to obtain a single sequence (Z) and this will be the generator output of pseudo-random bits based on chaos (Output block 1);

Where the generator is implemented in logic processing unit to generate at least a multi-modal map is defined by the number k defines the maximal numbers of modals in a family $\Im$ and the interval $\Im=[a,b]$ is divided between k subintervals $\Im_0=[d_1, d_2), \ldots, \Im_{k-1}=[d_{k-1}, d_k]$, then the system $f_\beta$ is a piecewise function by k uni-modal maps. The parameterized family $\Im$ is defined by the following piecewise function:

$$f_\beta = \beta(d_{r+1}-x)(x-d_r), x \in \Im_r \quad (1)$$

Where $d_r = r/k$, $(r=0,1,2 \ldots, k-1)$, k is the number of modals, $\beta=\beta(k,\gamma)$ is the bifurcation parameter, $\gamma=1/k$ is the carrying on capacity. To obtain the maximum value of $\beta$ with k modals there is a direct relationship, $\beta_{max}=4k/\gamma$.

And taking the values of $\beta_j$ and split the space into 2j regions $\delta_1^j$, to $\delta_{2j}^j$ which are determined by values to $\kappa_1^j$ to $k_{(2j)-1}^j$.

In a preferred embodiment, said method further comprises the steps of: iterating the system $x_n^j=f_{\beta_j}(x_n)$ and depending on which region evolves the represent the value of 0 or 1 of the binary sequence $\zeta^j$, generate a k number of chaotic time series by $x_n^j$ 32 $f_{\beta_j}(x_n)$ and each one produces a binary sequence $\zeta^j$, mixing each of said binary sequence for generating a final sequence Z is as follows:

$$Z=\zeta^1 \oplus \zeta^2 \oplus \ldots \zeta^k.$$

The invention, further comprises a stream cipher derived from the pseudo-random bit generator, said stream cipher comprising:

$$C_1 = P_1 \oplus Z_1 \oplus IV$$

$$C_i = P_i \oplus Z_i \oplus C_{i-1}$$

where $c_i$ is the ith pixel of the cipher image c 112, $P_i$ is the ith pixel of the augmented image P, wherein the value of $P_1$=IV(1,1), $Z_i$ is the key stream 106, IV $\in \{0,1, \ldots, 255\}$ is an initialization vector 108, and $\oplus$ is the operation XOR bit by bit.

As a further embodiment, the instant invention includes a pseudo-random bit generator comprising a multi-modal chaotic map defined as:

$$f_\beta = \beta(d_{r+1}-x)(x-d_r), x \in \Im_r.$$

set the value of $k \in \mathbb{N}^+$.

obtaining the values of $\beta_i$, for j=from at least 1, to the final value k by the following equations:

$$\beta_1 = 4k; \quad (2)$$

$$\beta_i = (j)(\beta_1); \text{ for } 2 \leq j \leq k \quad (3)$$

And taking the values of $\beta_j$ and split the space into 2j regions $\delta_1^j$, to $\delta_{2j}^j$ which are determined by values $\kappa_1^j$ to $k_{(2j)-1}^j$.

In a preferred embodiment, said method further comprising the steps of: iterating the system $x_n^j=f_{\beta_j}(x_n)$ and depending on which region evolves the represent the value of 0 or 1 of the binary sequence $\zeta^j$, generate a k number of chaotic time series by $x_n^j=f_{\beta_j}(x_n)$ and each one produces a binary sequence $\zeta^j$, mixing each of said binary sequence for generating a final sequence Z is as follows:

$$Z=\zeta^1 \oplus \zeta^2 \oplus \ldots \zeta^k. \quad (4)$$

To build the generator from any k 102 value, comprising the following steps:

A. Define a k-modal map.

B. Choose k initial conditions and k different parameters of bifurcation.

C. Generate real numbers of a chaotic sequence.

D. Provide a partition of the phase space where the k-modal map evolves.

E. Generate binary sequences by means of the phase space partition.

F. Select pseudo-random bit sequences that pass the NIST suite of statistical test.

BLOCK 2 (Enc).—COMBINED SEQUENCE VALIDATION. During this stage it is important to evaluate the output of the generator and be sure that the sequence is cryptographically secure, so this a suite of statistical tests proposed by NIST (10) (National Institute of Standards and Technology), used this suite consists of 15 independent tests.

Figure 5:
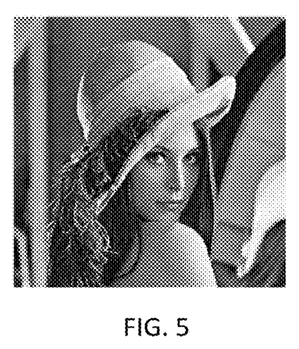
FIG. 5 is a conventional image that has the distribution of pixels to encrypt and preparing to use the method to generate binary sequences through a pseudo-random bit generator based on chaos.
Figure 6:
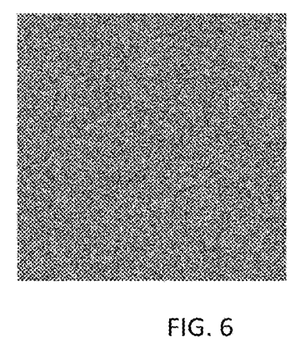
FIG. 6 is the representation of the conventional image of FIG. 5 with encryption with a key $x_1$, those obtained in the method for generating binary sequences through a pseudo-random bit generator based on chaos;.
Figure 7:
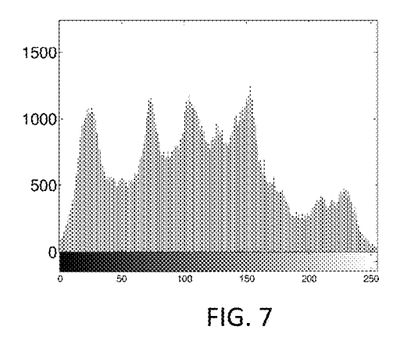
FIG. 7 is the view of the histogram of the conventional image of FIG. 5, which it has the distribution of pixels to encrypt and preparing to use the method to generate binary sequences through a pseudo-random bit generator based on chaos.
Figure 8:
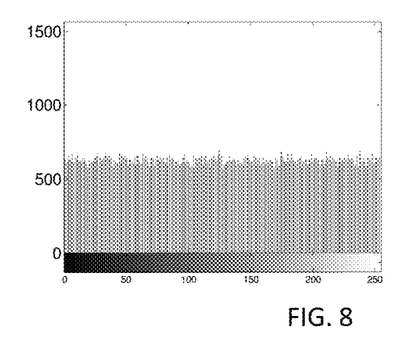
FIG. 8 is the view of the histogram of the conventional image of FIG. 7 with encryption with a key $x_1$, those obtained in the method for generating binary sequences through a pseudo-random bit generator based on chaos.

In this block takes you run the application and for better understanding, the encryption process will be explained by a cipher chain, as an example in a grayscale image (see FIG. 5), in this block we guarantee that when the image is cipher even with the same key the cipher image will be different each time. Some ciphers like AES[1] each time an image is encrypted with the same key, the result is always the same, this is $C_1=C_2$. If the histograms $C_1$ and $C_2$ are subtracted, the result is zero, this indicates that this is the same image.

[1] Advanced Encryption Standard (AES), also known as Rijndael (pronounced "Rain Doll" in English) is a scheme for block cipher adopted as a standard by the US government encryption. The AES was announced by National Institute of Standards and Technology (NIST) FIPS PUB 197 US (FIPS 197) on Nov. 26, 2001, after a standardization process that lasted 5 years, it became a standard effective on 26 May 2002. Since 2006, AES is one of the most popular algorithms used in symmetric cryptography.

Figure 9:
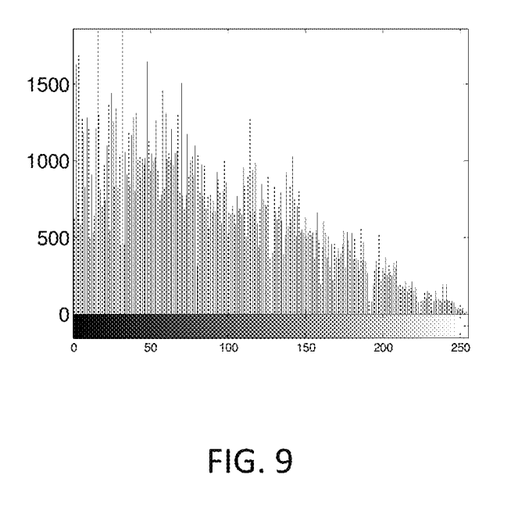
FIG. 9 is the view of the histogram obtained from differences in encrypted histograms in FIGS. 7 and 8.

Furthermore, when using the encryption algorithm of the present invention, it is noted that by subtracting $C_1$ and $C_2$ histograms, the histogram FIG. 9 is obtained.; this is because images $C_1 \neq C_2$, under the condition that were encrypted with the same key $x_1$.

It should be noted that the reverse process (decryption) always produces as output the original image, no matter what embodiment was obtained in the encryption process, for it is said that the decryption process is deterministic; in other words the process of encryption will be probabilistic while the process of decryption will be deterministic.

In order to evaluate the properties of the encryption process we use a statistical tests and show that when we increase the number of modals (k) then it will increase the number of change in the value of the pixels in the cipher image, this can be measured by the encryption quality.

Then the second block of the present invention is a method for encryption that includes a probabilistic process comprising the steps of:

A. Take the output of the first block like the input of the second block.

B. Provide a grayscale image of size N*M.

C. Choose an initiation vector IV (size N*1) (stochastic vector).

D. Generate the augmented image of size N*(M+1) given by the stochastic vector and the image.

E. Mix the pseudo-random bit sequence generated in the first block with the sequence of bits given by the augmented image.

EXAMPLE

In order to provide technical support to the novelty of the invention and its implementation mechanism, we exemplify the process for k=3.

A. So the first step is given by k=3.

B. According to the second step, $\beta_1=12$, $\beta_2=24$, $\beta_3=36$.

Figure 2:
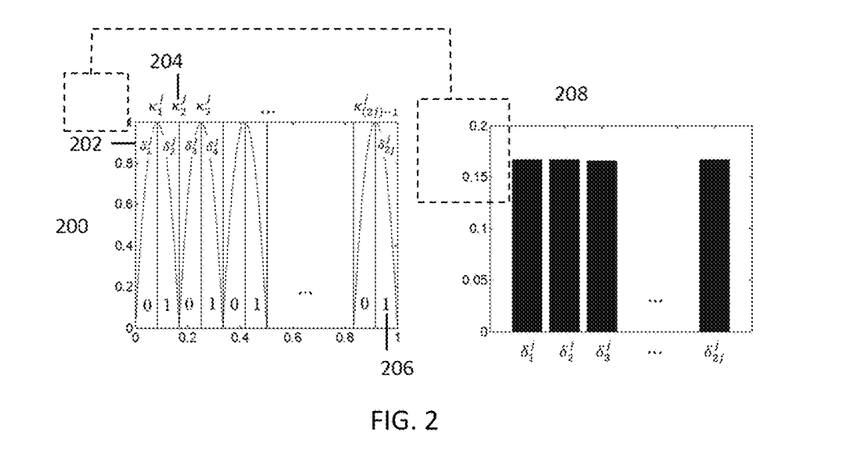
FIG. 2 shows a block diagram describing the pseudo-random generator based on multimodal maps, which implements the method for generating binary sequences.

C. The third step is to take $\beta_1$ for obtaining the sequence $\zeta^1$, therefore the space is divided in two regions $\delta_1^1$ and $\delta_2^1$ splitted by $\kappa_1^1=\frac{1}{6}$. These regions represent a 0 and a 1, respectively, the regions and the histogram of the two regions would be like the present in FIG. 2.

D. Now we need to compute $\zeta^2$ and $\zeta^3$, so carry on with $\beta_2$, we have a bimodal map with four regions $\delta_1^2, \ldots, \delta_4^2$ separated by $\kappa_1^2=0.1521$, $\kappa_2^2=0.40174$, $\kappa_3^2=0.5954$. Next for the last case $\beta_3$ splits the space in six regions $\delta_1^3, \ldots, \delta_6^3$ which are determined by the values $\kappa_1^3=0.1465$, $\kappa_2^3=0.396$, $\kappa_3^3=0.639$, $\kappa_4^3=0.8335$, $\kappa_5^3=0.9572$.

E. Finally, the sequences are mixed by $Z=\zeta^1 \oplus \zeta^2 \oplus \zeta^3$ where $\oplus$ is the XOR operation. We have computed some values that $\kappa\square$ can take for different values of k and they are shown in Table 1.

TABLE 1

Summary of values $\kappa$.

| Map | $\beta = \beta_1$ | $\beta = \beta_2$ | $\beta = \beta_3$ | $\beta = \beta_4$ |
|---|---|---|---|---|
| $\kappa = 1$ | $\kappa_1^1 = 1/2$ | — | — | — |
| $\kappa = 2$ | $\kappa_1^1 = 1/4$ | $\kappa_1^2 = 0.2273$ | — | — |
| | | $\kappa_2^2 = 0.6020$ | | |
| | | $\kappa_3^2 = 0.8931$ | | |
| $\kappa = 3$ | $\kappa_1^1 = 1/6$ | $\kappa_1^2 = 0.1521$ | $\kappa_1^3 = 0.1465$ | — |
| | | $\kappa_2^2 = 0.4017$ | $\kappa_2^3 = 0.3960$ | |
| | | $\kappa_3^2 = 0.5954$ | $\kappa_3^3 = 0.3690$ | |
| | | | $\kappa_4^3 = 0.8335$ | |
| | | | $\kappa_5^3 = 0.9572$ | |
| $\kappa = 4$ | $\kappa_1^1 = 1/8$ | $\kappa_1^2 = 0.1140$ | $\kappa_1^3 = 0.1105$ | $\kappa_1^4 = 0.1070$ |
| | | $\kappa_2^2 = 0.3012$ | $\kappa_2^3 = 0.2970$ | $\kappa_2^4 = 0.2911$ |
| | | $\kappa_3^2 = 0.4465$ | $\kappa_3^3 = 0.4790$ | $\kappa_3^4 = 0.4829$ |
| | | | $\kappa_4^3 = 0.6250$ | $\kappa_4^4 = 0.6576$ |
| | | | $\kappa_5^3 = 0.7180$ | $\kappa_5^4 = 0.8034$ |
| | | | | $\kappa_6^4 = 0.9114$ |
| | | | | $\kappa_7^4 = 0.9776$ |

In order to characterize the proposed generator and demonstrate that it is safe for use in cryptography, it must be analyzed with a variety of statistical tests. These statistical tests determine whether the generated sequences possess specific characteristics similar to truly random sequences.

To achieve this goal there are several options available for analyzing the randomness of the pseudo-random bit generators, however the most used and standard test is defined by the NIST [10] that contains a sufficient number of independent statistical tests and detects any deviation from the randomness, the results are shown in Table 2 and 3.

TABLE 2

Part 1 of results from statistical suite of tests.

| Test name | Uni-modal Result | Bi-modal Result | Tri-modal Result | Quad-modal Result |
|---|---|---|---|---|
| Frequency Test | Success | Success | Success | Success |
| Frequency Test within a Block | Fail | Success | Success | Success |
| Runs Test | Success | Success | Success | Success |
| Test for the Longest Run | Success | Success | Success | Success |
| Binary Matrix | Success | Success | Success | Success |
| Discrete Fourier Transform | Success | Success | Success | Success |
| Overlapping Template Matching Test | Fail | Success | Success | Success |
| Maurer's Universal Statistical Test | Success | Success | Success | Success |
| Approximate Entropy | Fail | Success | Success | Success |
| Linear Complexity | Success | Success | Success | Success |

TABLE 3

Part 2 of results from statistical suite of tests.

| Test name | Uni-modal Result | Bi-modal Result | Tri-modal Result | Quad-modal Result |
|---|---|---|---|---|
| Serial Test 1 | Success | Success | Success | Success |
| Serial Test 2 | Success | Success | Success | Success |
| Cumulative Sums Test | | | | |
| a) Forward | Success | Success | Success | Success |
| b) Backward | Success | Success | Success | Success |

TABLE 3-continued

Part 2 of results from statistical suite of tests.

| Test name | Uni-modal Result | Bi-modal Result | Tri-modal Result | Quad-modal Result |
|---|---|---|---|---|
| Non-overlapping Template Matching Test | | | | |
| a) | Success | Success | Success | Success |
| b) | Success | Success | Success | Success |
| c) | Success | Success | Success | Success |
| d) | Success | Success | Success | Success |
| e) | Fail | Success | Success | Success |
| Random Excursions Test | | | | |
| a) −4 | Success | Success | Success | Success |
| b) −3 | Success | Success | Success | Success |
| c) −2 | Success | Success | Success | Success |
| d) −1 | Success | Success | Success | Success |
| e) 1 | Success | Success | Success | Success |
| f) 2 | Success | Success | Success | Success |
| g) 3 | Success | Success | Success | Success |
| h) 4 | Success | Success | Success | Success |
| Random Excursions Variant Test | | | | |
| a) −9 | Success | Success | Success | Success |
| b) −8 | Success | Success | Success | Success |
| c) −7 | Success | Success | Success | Success |
| d) −6 | Success | Success | Success | Success |
| e) −5 | Success | Success | Success | Success |
| f) −4 | Success | Success | Success | Success |
| g) −3 | Success | Success | Success | Success |
| h) −2 | Success | Success | Success | Success |
| i) −1 | Success | Success | Success | Success |
| j) 1 | Success | Success | Success | Success |
| k) 2 | Success | Success | Success | Success |
| l) 3 | Success | Success | Success | Success |
| m) 4 | Success | Success | Success | Success |
| n) 5 | Success | Success | Success | Success |
| o) 6 | Success | Success | Success | Success |
| p) 7 | Success | Success | Success | Success |
| q) 8 | Success | Success | Success | Success |
| r) 9 | Success | Success | Success | Success |

The second block 120 of FIG. 1 comprises the encryption algorithm of the information by means of a stream-cipher, in the inputs of this block we have the pseudo-random sequence Z 106, the initialization vector IV 108 and the information which in this case is a grayscale image denoted by img 110. In the output of this block we have the cipher image c 112.

Figure 3:
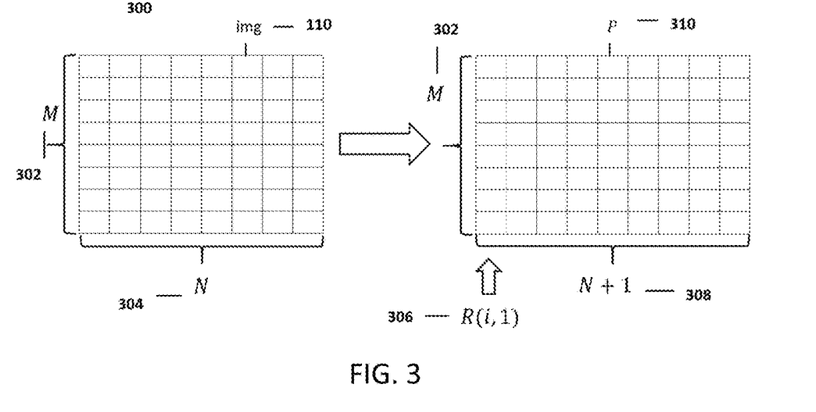
FIG. 3 is a block diagram for describing a pre-process for encryption, as an application example of the method for generating binary sequences through a pseudo-random bit generator based on chaos.

The first step is a pre-processing of the plain image to an augmented image, this is shown by the block 300 of FIG. 3, at this point the plain image 110 of FIG. 1 have M 302×N 304 pixels, now we add a column of random values IV (i, 1) 306 with i=1, . . . , M. The values of IV belong to {0, 1, . . . , 255} so the size of the augmented image P 310 will increase to M 302×(N+1) 308.

Figure 4:
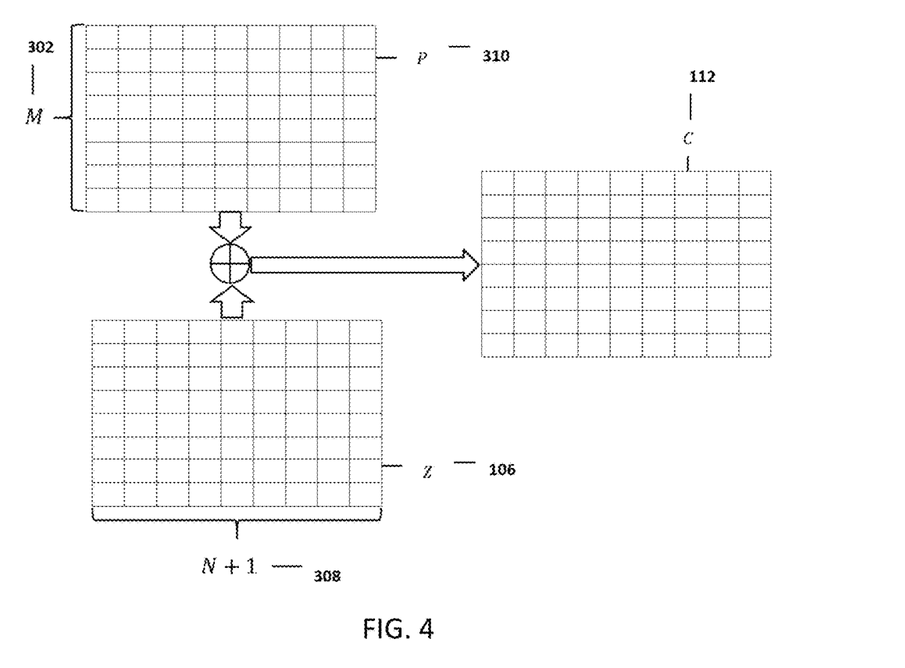
FIG. 4 is a block diagram describing the encryption process, as an application example of the method for generating binary sequences through a pseudo-random bit generator based on chaos.

In order to cipher the image P 310 we have a total of (M)(N+1) pixels and take pixel by pixel as follows (see FIG. 4):

$$C_1 = P_1 \oplus Z_1 \oplus IV$$

$$C_i = P_i \oplus Z_i \oplus C_{i-1} \quad (5)$$

Where $C_i$ is the ith pixel of the cipher image C 112, $P_i$ is the ith pixel of the augmented image P 310, note that the value of $P_1$=IV(1,1), $Z_i$ is the key stream 106, IV ∈ {0, 1, . . . , 255} is an initialization vector 108, it is used only once and ⊕ is the operation XOR bit by bit. For decrypt the image we need the same key stream for this we need the values: k 102, the initial conditions $x_{01}, x_{02}, \ldots, x_{0k}$ 104 and the initialization vector (IV) 108 as follows:

$$P_1 = C_1 \oplus Z_1 \oplus IV$$

$$P_i = C_i \oplus Z_i \oplus C_{i-1} \quad (6)$$

Note that the decrypted image has one extra column so when the process of decrypt is completed we need to remove this column to get original size of the image (N) (M).

The quality of the encryption process as set herein above, can be determined as follows: Encryption quality represents the average number of changes to each gray level and it can be expressed as:

$$Q = \frac{\sum_{L=0}^{255} |H_L(C) - H_L(P)|}{256}.$$

where L is the gray levels of the images, $H_L(C)$ and $H_L(P)$ are the numbers of repetition from each gray value in the original and the encrypted image respectively, we claim that if we increase the number k of one multi-modal map then the encryption quality of the cipher image will increase too.

What is claimed is:

1. A method for generating binary sequences through a pseudo-random bit generator based on chaos, comprising the following steps:
   providing a generator block and a validation block;
   defining a k-modal map on the generator block; the k-modal map is defined by:

$$f_\beta = \beta(d_{r+1} - x)(x - d_r), x \in \mathfrak{S}_r,$$

generating a set of k independent sequences represented as {x1, x2, x3, x4, . . . xk}, wherein each independent sequence is produced using a dynamic system by a logic unit processing;
   combining the k independent sequences to obtain a single sequence (Z);
   using the single sequence (Z) as a generator block output;
   wherein the set of k independent sequences defines maximal numbers of modals in a family $\mathfrak{S}$ and an interval $\mathfrak{S}$=[a, b] is divided between k subintervals $\mathfrak{S}_0$=[$d_1$, $d_2$], . . . , $\mathfrak{S}_{k-1}$=[$d_{k-1}$, $d_k$], then a system $f_\beta$ is a piecewise function by k; the parameterized family $\mathfrak{S}$ is defined by the following piecewise function
   wherein: $d_r$=r/k,(r=0,1,2, . . . , k−1), k is the number of modals, β=β(k,γ) is the bifurcation parameter, γ=1/k is the carrying on capacity; to obtain the maximum value of β with k modals there is a direct relationship, $\beta_{max}$=4k/γ;
   entering the generator block output as input on the validation block, the validation block including an encryption algorithm by a stream-cipher;
   validating a combined sequence by evaluating the output of the generator to be sure that the sequence is cryptographically secure.

2. A pseudo-random bit generator based on chaos comprising a processor and a memory and a logic unit processing, wherein logic unit processing includes a block 1 and a block 2;
   wherein the block 1:
   defines a k-modal map;
   chooses k initial conditions and k different parameters of bifurcation;

generates real numbers of chaotic sequence, wherein each independent chaotic sequence is produced using a dynamic system by the logic unit processing;

provides a partition of the phase space where the k-modal map evolves;

generates binary sequences by using the phase space partition;

selects pseudo-random bit sequences that pass the National Institute of Standards and Technology (NIST) suite of statistical test; combines the chaotic independent sequences to obtain a single sequence (Z);

uses the single sequence (Z) as an output for the block 1: and wherein the block 2:

takes the output of the block 1 as an input of the block 2;

provides a grayscale image of size N*M;

chooses an initiation vector IV (size N*1) (stochastic vector);

generates an augmented image of size N*(M+1) given by the stochastic vector and the image;

mixes the pseudo-random bit sequence generated in the block 1 with the sequence of bits given by the augmented image.

3. The method for generating binary sequences through a pseudo-random bit generator based on chaos according to claim 1, wherein the stream-cipher by multi-modal dynamical systems comprises a pseudo-random generator block based on k multi-modal maps 110, in the inputs of the pseudo-random generator block has a k number 102 which denotes the number of modals and k initial conditions denoted by the vector $[x_0]$ 104, and output the pseudo-random sequence Z 106.

4. The method of claim 1, wherein the validation step comprises using a suite of independent statistical tests; and comparing said evaluation with a method of encryption; where in some encrypted, the result is always the same every time an image is encrypted with the same key, $C_1 = C_2$; if the histograms from images $C_1$ and $C_2$ are subtracted, the result is zero, indicating that is the same image; if images $C_1 \neq C_2$, under the condition that were encrypted with the same key $x_1$; and in the reverse (decryption) always produces as output of the original image, no matter what embodiment obtained in the encryption process; the encryption process is probabilistic while the decryption process is deterministic.

\* \* \* \* \*